United States Patent
Behrens et al.

(10) Patent No.: US 10,532,681 B2
(45) Date of Patent: Jan. 14, 2020

(54) SEAT INCLUDING A HEAD SENSOR (71) Applicant: Faurecia Automotive Seating, LLC, Auburn Hills, MI (US)

(72) Inventors: Dennis Behrens, Hannover (DE); Alper Büyükkoz, Bückeburg (DE)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 48 days.

(21) Appl. No.: 16/007,397

(22) Filed: Jun. 13, 2018

(65) Prior Publication Data
US 2019/0381920 A1 Dec. 19, 2019

(51) Int. Cl.
*B60N 2/888* (2018.01)
*B60N 2/427* (2006.01)
*B60N 2/00* (2006.01)

(52) U.S. Cl.
CPC ............. *B60N 2/888* (2018.02); *B60N 2/002* (2013.01); *B60N 2/4279* (2013.01); *B60N 2/42727* (2013.01)

(58) Field of Classification Search
None
See application file for complete search history.

(56) References Cited

U.S. PATENT DOCUMENTS

| 5,822,707 | A | 10/1998 | Breed |
| 7,145,263 | B2 | 12/2006 | Nathan |
| 7,448,678 | B2 | 11/2008 | Browne |
| 8,016,350 | B2 | 9/2011 | Dellanno |
| 8,184,856 | B2 | 5/2012 | Smith |
| 8,573,700 | B2 * | 11/2013 | Togura .................. B60N 2/002 297/391 |
| 8,781,689 | B2 | 7/2014 | Yetukuri |
| 8,911,019 | B2 * | 12/2014 | Josten ....................... A61F 4/00 297/217.3 |
| 9,114,766 | B1 * | 8/2015 | Pelini ...................... B60R 11/04 |
| 2002/0093565 | A1 * | 7/2002 | Watkins ................. B60R 11/02 348/148 |
| 2002/0162867 | A1 * | 11/2002 | Watkins ................. B60R 11/04 224/275 |

(Continued)

FOREIGN PATENT DOCUMENTS

DE    10062511 B4    6/2002
DE    10261896 A1    7/2004

(Continued)

OTHER PUBLICATIONS

Coat Hanger from BMW, available from https://www.bmwpartswholesale.com/oem-parts/bmw-coat-hanger-51-95-2-183-852-support-needed-to-make-this-part-work-51952449251?origin=pla&gclid=Cj0KCQjw6J7YBRC4ARIsAJMXXsd9eO6uiw7DV-vASYH46CbCTpkMPqsSq7Z9x6v93INn6gT6C93q7WAaAowrEALw_wcB, first accessed on May 25, 2018, 3 pages.

*Primary Examiner* — David E Allred
(74) *Attorney, Agent, or Firm* — Barnes & Thornburg LLP (57) ABSTRACT

A vehicle seat for use in a vehicle comprises a seat body for engagement with a seated occupant's body. The seat body including: a seat base for receiving a seated occupant and a backrest extending upward from the base for supporting the seated occupant's back, and a headrest connected with the backrest and projecting upward from the backrest. The headrest includes a receiving face facing forward for engagement with the occupant's head in the event of a sudden change in velocity to ease rearward movement of the occupant's head.

10 Claims, 5 Drawing Sheets

(56) References Cited

U.S. PATENT DOCUMENTS

| | | | | |
|---|---|---|---|---|
| 2003/0103140 A1* | 6/2003 | Watkins | ............... | B60R 11/02 |
| | | | | 348/148 |
| 2004/0195876 A1* | 10/2004 | Huiban | ............... | A47C 9/002 |
| | | | | 297/217.3 |
| 2008/0129100 A1 | 6/2008 | Szablewski | | |
| 2017/0259715 A1 | 9/2017 | Heo | | |

FOREIGN PATENT DOCUMENTS

| | | |
|---|---|---|
| DE | 102005010594 B4 | 9/2006 |
| JP | 2007280352 A | 10/2007 |

* cited by examiner

SEAT INCLUDING A HEAD SENSOR

BACKGROUND

The present disclosure relates generally to passenger vehicle seats, and more particularly, to devices, systems, and methods for head position detection of seated passengers of vehicles.

SUMMARY

According to the present disclosure, a vehicle seat for use in a vehicle may comprise a seat body for engagement with a seated occupant's body, the seat body including: a seat base for receiving a seated occupant and a backrest extending upward from the base for supporting the seated occupant's back, and a headrest connected with the backrest and projecting upward from the backrest. The headrest includes a receiving face facing forward for engagement with the occupant's head in the event of a sudden change in velocity to ease rearward movement of the occupant's head.

In illustrative embodiments, the vehicle seat further includes a distal sensor assembly for detecting the seated occupant's head position. The distal sensor assembly may include at least one hanger arm having a proximal end connected with the seat body and extending laterally from the proximal end to a distal end, and at least one head position sensor attached to the distal end of the at least one hanger arm for sensing the seated occupant's head position. The distal end of the at least one hanger arm may be positioned spaced apart from the headrest laterally relative to the receiving face of the passenger seat to avoid engagement with the occupant's head while positioning the at least one head position sensor for accurate sensing of the occupant's head position.

In illustrative embodiments, the at least one hanger arm may include two hanger arms each having a proximal end connected with opposite lateral sides of the seat body and extending to from the proximal end to a distal end. The at least one head position sensor may include at least two head position sensors, each of the two hanger arms having one of the at least two head positions sensor secured to its distal end to avoid engagement with the occupant's head while positioning the head position sensors for accurate sensing of the occupant's head position.

In illustrative embodiments, the hanger arms may each extend laterally away from the headrest in opposing lateral directions and at downward angles. The distal end of each hanger arm may be arranged laterally spaced apart from the headrest by a distance in the range of about 1 to about 7 inches.

In illustrative embodiments, the distal end of each hanger arm may be arranged forward of the receiving face of the headrest by a distance in the range of about 0 to about 4 inches.

In illustrative embodiments, the headrest may include headrest padding arranged to define the receiving face, and the at least one hanger arm may not include padding. In some embodiments, the at least one hanger arm may be connected with the headrest.

In illustrative embodiments, the at least one hanger arm may extend laterally away from the seat body and at a downward angle. The distal end of the at least one hanger arm may be arranged forward of a receiving face of the headrest by a distance in the range of 0 to 4 inches.

In illustrative embodiments, the seat may further comprise a control system in communication with the at least one sensor to receive a communication of the sensed position of the occupant's head. The control system may be configured to send instructions to a headrest adjustment device to adjust the position of the headrest to preferably accommodate the sensed position of the occupant's head to preferably ease rearward movement of the occupant's head in the event of a sudden change in velocity.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

In vehicles, such as automotive vehicles, determining an occupant's head position can enhance safety and/or comfort. Appropriate positioning of a headrest support relative to a specific occupant can increase comfort for the occupant or passenger as well as enhance effectiveness of the headrest's safe implementation. Accurate detection of occupant head position can be applied to determine the desired headrest position. However, detection of occupant head position can face practical challenges.

In-seat sensor placement can experience obstructions and/or confusion from various sources such as occupant size, shape, clothing, aesthetics, posture, and preferred and/or required seating arrangements. For example, occupants with long hair may present issues to in-seat sensors. Reducing interference with head position sensing can provide more consistent and/or reliable position detection. Spacing head position sensors away from the seat itself can reduce environmental interference and improve the accuracy of head position determination.

Figure 1:
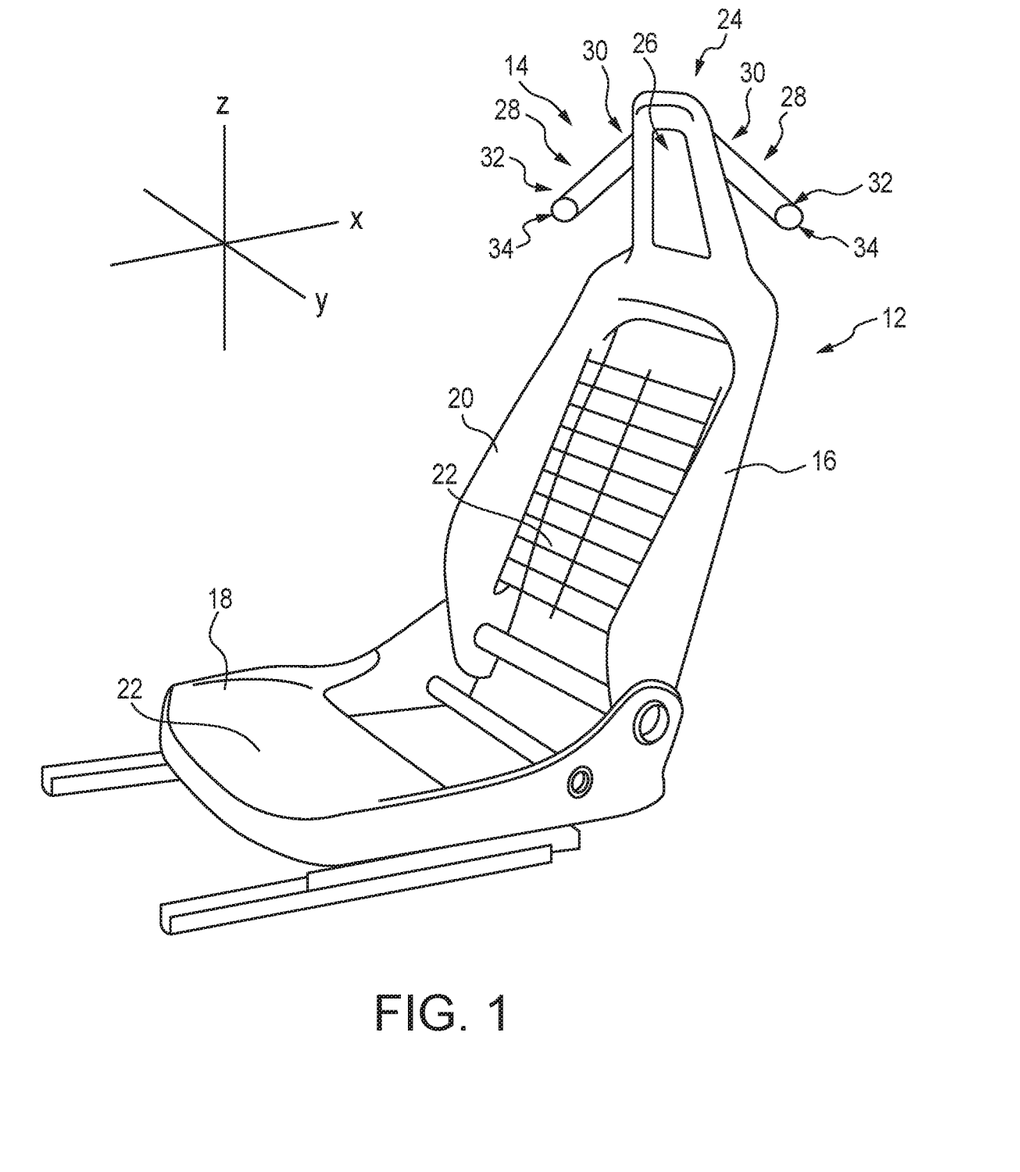
FIG. 1 is a perspective view of exemplary seat for use in a vehicle showing that the seat includes a headrest and a distal sensor assembly engaged with the seat and arranged to position two head position sensors laterally outward from the headrest to provide accurate position detection.

An illustrative vehicle seat 12 adapted for use in a vehicle is shown in FIG. 1 including a distal sensor assembly 14 for detecting the seated occupant's head position from a location spaced apart from the seat itself. The vehicle seat 12 includes a seat body 16 for supporting a seated occupant's body for transport. The seat body 16 illustratively includes a base 18 for receiving the seated occupant's posterior (bottom) and a backrest 20 for supporting the seated occupant's back. Each of the base 18 and backrest 20 have upper surfaces 22 for contact with the seated occupant to support the seated occupant's body for transport. The back rest 20 is illustratively shown connected with the base 18 and extending generally upward reclining slightly for engagement with the occupant's back. In some embodiments, the back rest 20 may have adjustable positioning, including but without limitation, the angle of recline relative to the base 18.

As shown in FIG. 1, the seat body 16 includes a headrest 24 for supporting a seated occupant's head. The headrest 24 is shown illustratively connected with the back rest 20 and extending generally upward for engagement with the seated occupant's head. The head rest 24 includes a receiving face 26 that faces generally forward (generally along the x-axis). The receiving face 26 is arranged for engagement with the seated occupant's head in the event of a sudden change in velocity of the seat 12, for example, a sudden in velocity induced by a collision incident of a vehicle in which the vehicle seat 12 is installed. Such sudden changes in velocity are not limited to collisions, but may also include abrupt braking, dramatic turning, and/or elevation changes (bumps). The headrest 24 and consequently the receiving face 26 are illustratively embodied as adjustable in position through an appropriate range of positions, for example but without limitation, through a range of headrest heights and/or range of distances from the occupant's head (i.e., along the x-axis), to accommodate proper positioning relative to the occupant's head position to enhance safe engagement with the occupant's head.

The distal sensor assembly 14 is arranged to detect the seated occupant's head position from a location spaced apart from the seat body 16. The assembly 14 illustratively includes a sensor mount embodied as hanger arms 28 extending from the seat body 16. The hanger arms 28 each include a proximal end 30 connected with the seat body 14 and a distal end 32 spaced apart from the seat body 14. A sensor 34 is attached to each hanger arm 28 at the distal end 32 to sense the seated occupant's head position while avoiding engagement with the occupant's head.

Figure 2:
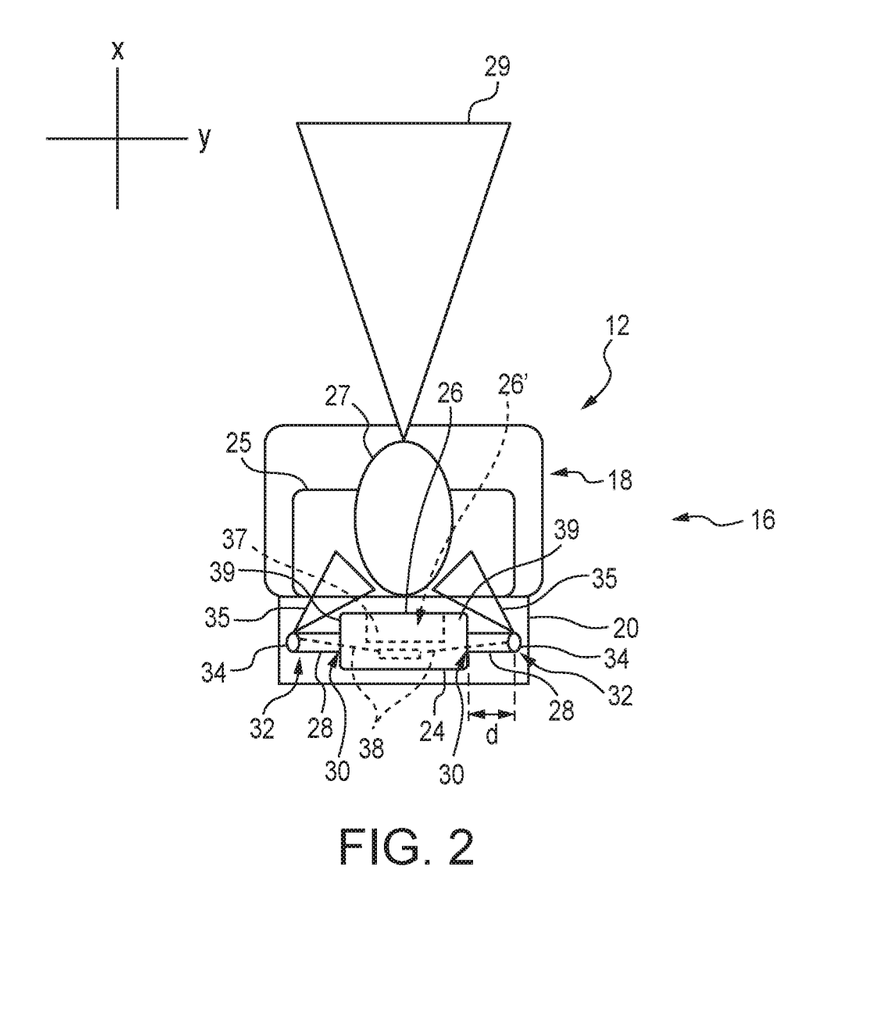
FIG. 2 is an overhead plan view of the exemplary seat of FIG. 1.

As shown in FIG. 2, an occupant 25, also called passenger 25, is shown seated in the vehicle seat 12 with her head 27 facing forward (generally upward along the x-axis) as indicated by her field of view 29. The sensors 34 are arranged spaced apart from the seat body 14, including the headrest 24, to sense the occupant's head position while avoiding obstructions and without engaging the occupant's head 27. In the illustratively embodiment, the sensors 34 can be spaced apart from the headrest 24 by a distance d (generally along the y-axis) within the range of about 1 to about 7 inches.

An exemplary field of sensing view is represented as field 35 to show that the sensors 34 are arranged with additional depth from the occupant's head 27 (compared with the headrest 24) to have a free assessment of the occupant's head 27 that is clear of obstructions, to improve accuracy of the head position detection while avoiding engagement with the occupant's head 27. In the illustrative embodiment, the occupant's head 27 is not normally engaged with the receiving face 26, however, in some embodiments, the seat 12 may be arranged to support the occupant's head 27 to be in frequent and/or or constant contact with the receiving face 26, for example, in racing seat applications.

By example, a cutout 37 of the headrest 24 is shown in broken line in FIG. 2. Even headrests which may have sensors mounted within side contours 39, such as those created by the cutout 37, fail to position the sensors outside of the expected engagement range for the seat body 16 with the passenger. The lack of spacing can disrupt sensor operation and/or lead to confusion and/or obstructions in sensing the occupant's head position. By the arrangements as shown in FIG. 2, the sensors 34 while spaced apart from the headrest 24 are positioned rearward of the receiving face 26, and rearward of the alternative receiving face 26' in embodiments having the optional cutout 37 removed. As discussed in additional detail herein, a portion of a control system may be arranged within the occupant seat 12 in communication with the sensors 34 by wiring 38 that extends through the hanger arms 28.

Figure 3:
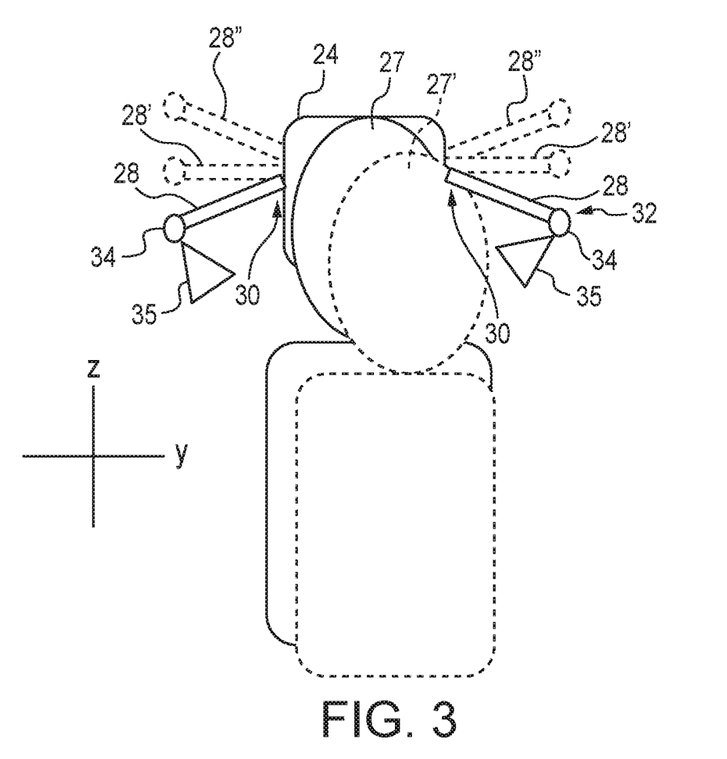
FIG. 3 is a front elevation view of the exemplary seat of FIG. 1.

As shown in FIG. 3, an example of a passenger having a first head position 27 (solid line) and second head position 27' (broken line) is shown for descriptive purposes. The different positions can represent a shift in the occupant's position and/or different occupant's having different desired sitting positions. In either position 27, 27' the sensors 34 have clear range of sensing of the occupant's head position.

Also shown in FIG. 3, the hanger arms 28 are illustratively connected with the headrest 24 and are shown having a downward angle. Namely, the distal end 32 of each hanger arm 28 is lower than the proximal end 30 creating a slanted extension from the headrest 24 to arrange the sensors 34 spaced apart from the seat body 14. Alternative arrangements of the hanger arms 28 are shown including horizontal 28' and upward incline 28". In some embodiments, the arrangement of the hanger arm 28 may be adjustable between downward, horizontal, and upward arrangements.

Figure 4:
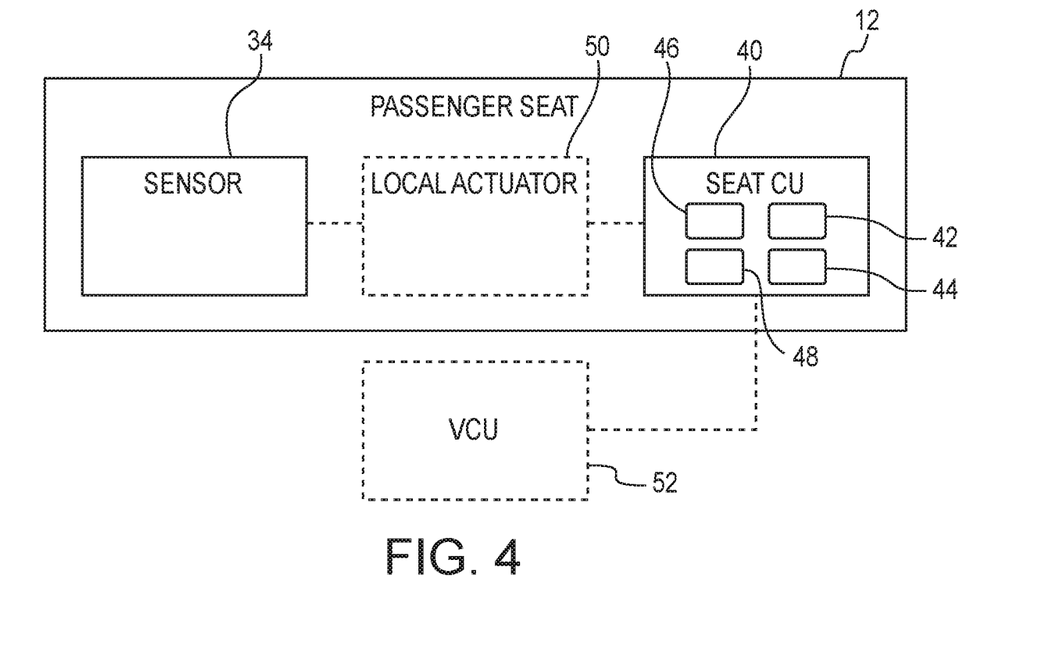
FIG. 4 is a diagrammatic view of the distal sensor assembly in communication with a control system of the passenger seat of FIG. 1 for operation.

Referring now to FIG. 4, a control diagram is shown. The sensors 34 themselves are shown as a portion of the occupant seat 12, although arranged spaced apart from the seat body 14, as previously mentioned. Each sensor 34 is in communication with a seat control unit 40 for sending an indication of the sensed head position information regarding the occupant's head position. The seat control unit 40 illustratively includes a processor 42 for execution of instruction stored on a memory device 44, and communication circuitry 46 for sending and receiving communication signals as directed by the processor 42.

Optional control actuators 48 are illustratively shown as a part of the control unit 40 for adjustment of one or more of the seat position characteristics such as the base height, back rest angle, lumbar support, headrest height, distance between the headrest and the occupant's head (i.e., along the x-axis), and/or headrest angle, and/or combinations thereof, etc. An optional local actuator 50 is shown in broken line adapted to provide automated adjustment of the headrest 24 according to the command of the seat control unit 40 based on the detected head position. The local actuator 50 may include mechanical operation, for example, linear, rotary, pneumatic, hydraulic, and/or any suitable actuation type, number, and/or arrangement for positioning the headrest 24 appropriately.

The control unit 40 receives indication of the sensed occupant head position from one or more of the sensors 34, determines the appropriate height, distance between the headrest and the occupant's head (i.e., along the x-axis), and/or angle of the headrest 24 based on the indication of the head position from the sensors 34, and (in embodiments having the local actuator 50) communicates a command to the local actuator 50 to adjust the headrest 24 to the appropriate position. In some embodiments, the headrest 24 may be adjustable in height, distance between the headrest and the occupant's head (i.e., along the x-axis), and/or angle according to the user command via the control actuators 48 communicating with the local actuator 50 and/or by manual adjustment of the headrest 24. In some embodiments, the sensors 34 may optionally be arranged in communication with a vehicle control unit (VCU) 52 of the vehicle, in place of or in addition to the seat control unit, for determining and controlling appropriate headrest position. In some embodiments, other features of the occupant seat and/or vehicle may be adjustable on the basis of the head position indicated by the sensors and/or control unit directly and/or via the VCU 52, for example but without limitation, airbag positions, operation, pressures, etc.; seat belt positions; display positions, and/or mirror positions.

Figure 5:
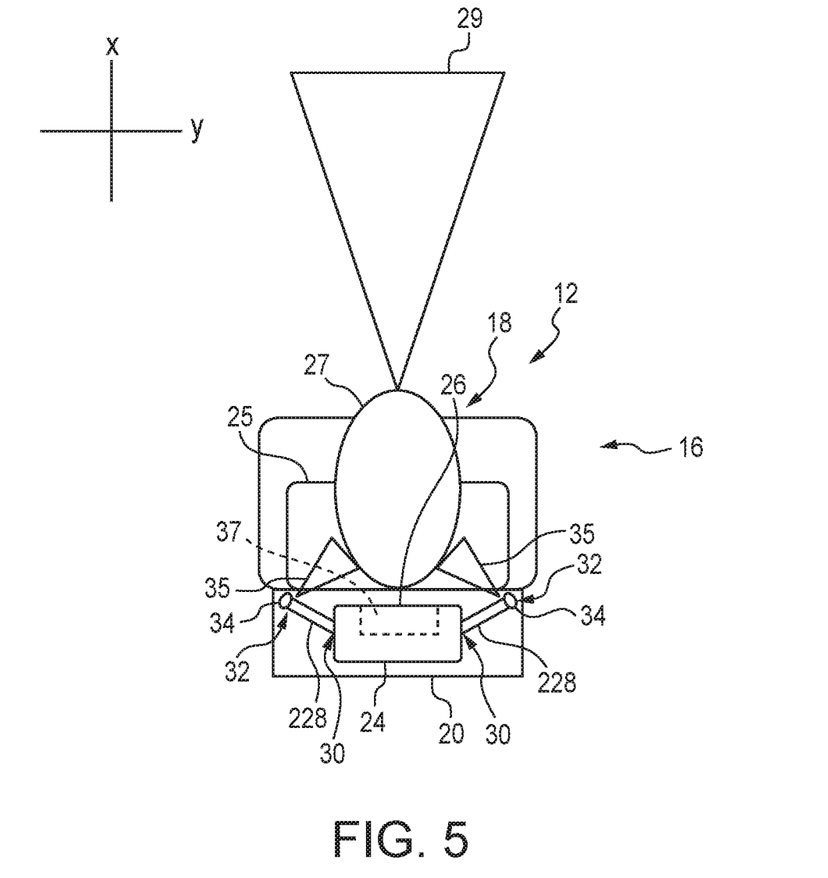
FIG. 5 is an overhead plan view of another embodiment of hanger arms of the distal sensor assembly of the passenger seat of FIGS. 1-4.

Referring now to FIG. 5, another embodiment of the hanger arms 228 of the vehicle seat 12 is shown in which arms 228 are angled forward. The disclosure of the hanger arms 28 applies equally to hanger arms 228, except in instances of conflict. The distal end 32 and thus the sensor 34 of each hanger arm 228 are arranged forward of the receiving face 26 of the headrest 24. In some embodiments, the sensor 34 may be arranged in the same plane as the receiving face 26, 26' (e.g., 0 inches forward), and/or within any suitable range including but without limitation, within the range of about 0 to about 4 inches forward of the receiving face 26, 26'. The hangers arms 228 illustratively include the same downward angling as the hanger arms 28, and in some embodiments, may have any of the alternative angling of the hanger arms 28', 28". Accordingly, the sensors 34 can be arranged to accurately sense the occupant head position while avoiding engagement with the occupant's head 27.

Figure 6:
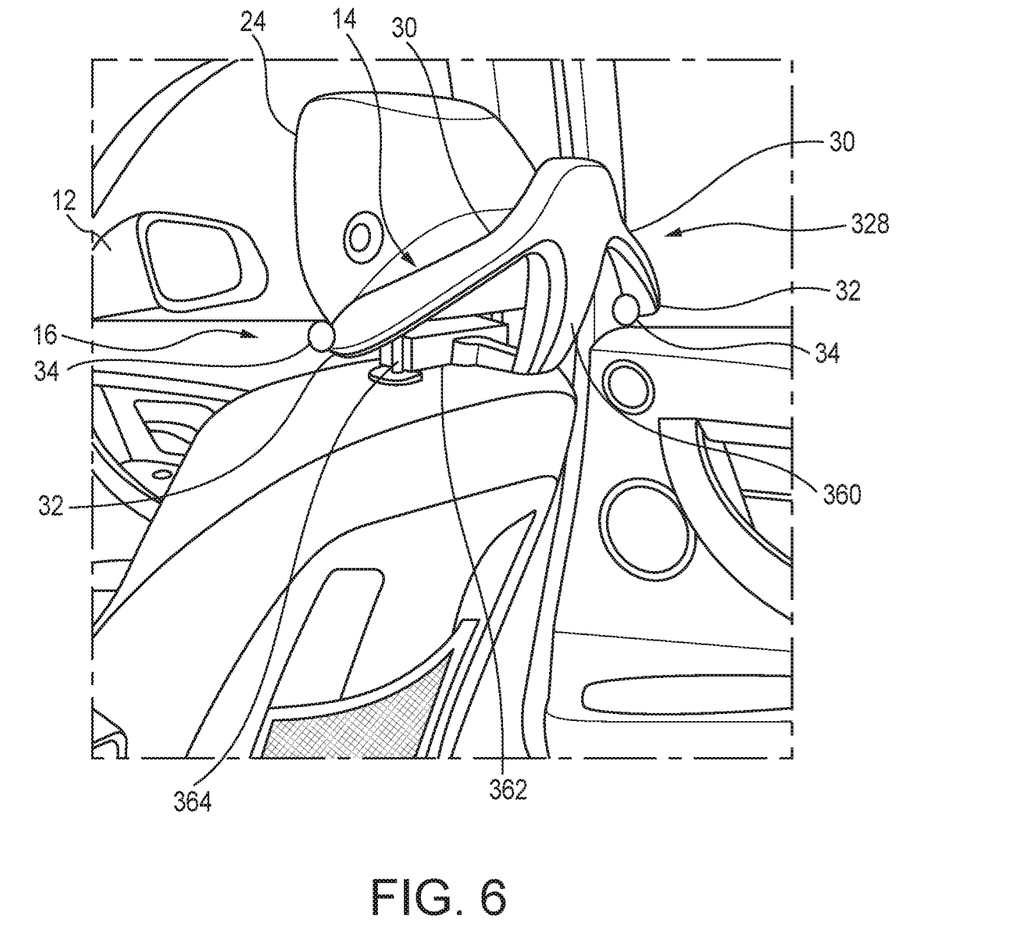
FIG. 6 is a rear perspective view of another embodiment of hanger arms of the distal sensor assembly of the passenger seat of FIGS. 1-4.

As shown in FIG. 6, another embodiment of the hanger arms 328 of the distal sensor assembly 14 is shown. The disclosure of the hanger arms 28, 228 apply equally to hanger arms 328, except in instances of conflict. The hanger arms 328 are similar to the hanger arms 28, 228, except the proximal end 30 of each arm 328 is connected with a stem 360 which is connected with a mount 362 secured with the seat body 16 beneath the headrest 24. The mount 362 is secured removably about the support posts 364 of the headrest 24 to provide a detachable arrangement that can be easily added to an existing vehicle seat 12.

The present disclosure includes devices, systems, and methods for seats having occupant head position detection through providing an unobscured view by mounting sensors onto hanger arms spaced apart from portions of the occupant seat. While the seat portions intended for engagement with the occupant's body and/or head, in some embodiments, the hanger arms may be unpadded as they are arranged to avoid engagement with the occupant. Applied sensors may include any suitable type of sensing occupant head position, including but without limitation, still camera, video camera, ultrasound, infrared, laser, lidar, radar, and/or combinations thereof.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The following numbered clauses include embodiments that are contemplated and non-limiting:

Clause 1. A vehicle seat for use in a vehicle, the vehicle seat comprising a seat body including a seat base and a backrest arranged to extend upward from the base.

Clause 2. The vehicle seat of clause 1, any other clause, or any combination of clauses, wherein the vehicle seat further includes a headrest connected with the backrest to project upward from the backrest.

Clause 3. The vehicle seat of clause 2, any other clause, or any combination of clauses, wherein the headrest including a receiving face facing in a forward direction.

Clause 4. The vehicle seat of clause 3, any other clause, or any combination of clauses, further comprising a distal sensor assembly for detecting a head position of an occupant seated on the seat body, the assembly including at least one arm having a proximal end connected with the seat body and extending laterally from the proximal end to a distal end.

Clause 5. The vehicle seat of clause 4, any other clause, or any combination of clauses, wherein the distal sensor assembly includes at least one head position sensor attached to the distal end of the at least one arm for sensing the head position of the occupant.

Clause 6. The vehicle seat of clause 5, any other clause, or any combination of clauses, wherein the distal end of the at least one arm is positioned spaced apart from the headrest laterally relative to the receiving face of the headrest.

Clause 7. The vehicle seat of clause 6, any other clause, or any combination of clauses, wherein the at least one arm includes two arms each having a proximal end connected with opposite lateral sides of the seat body and extending from the proximal end to a distal end, and the at least one head position sensor includes at least two head position sensors, each of the two arms having one of the at least two head position sensor secured to its distal end of each arm.

Clause 8. The vehicle seat of clause 7, any other clause, or any combination of clauses, wherein the arms each extend laterally away from the headrest in opposing lateral directions and at downward angles.

Clause 9. The vehicle seat of clause 3, any other clause, or any combination of clauses, wherein the distal end of each arm is arranged laterally spaced apart from the headrest by a distance in a range of about 1 inch to about 7 inches.

Clause 10. The vehicle seat of clause 9, any other clause, or any combination of clauses, wherein the distal end of each arm is arranged forward of the receiving face of the headrest by a distance in a range of about 0 inches to about 4 inches.

Clause 11. The vehicle seat of clause 9, wherein the distal end of each arm is arranged forward of the receiving face of the headrest by a distance greater than about 2 inches.

Clause 12. The vehicle seat of clause 6, any other clause, or any combination of clauses, wherein the headrest includes headrest padding arranged to define the receiving face, wherein the at least one arm does not include padding.

Clause 13. The vehicle seat of clause 6, any other clause, or any combination of clauses, wherein the at least one arm is connected with the headrest.

Clause 14. The vehicle seat of clause 6, any other clause, or any combination of clauses, wherein the at least one arm extends laterally away from the seat body and at a downward angle.

Clause 15. The vehicle seat of clause 6, any other clause, or any combination of clauses, wherein the distal end of the at least one arm is arranged forward of a receiving face of the headrest by a distance in the range of about 0 to about 4 inches.

Clause 16. The vehicle seat of clause 6, any other clause, or any combination of clauses, wherein the distal end of the at least one arm is arranged forward of a receiving face of the headrest by a distance greater than about 1 inch.

Clause 17. The vehicle seat of clause 6, any other clause, or any combination of clauses, further comprising a control system in communication with the at least one sensor to receive a communication of a sensed position of the occupant's head and configured to send instructions to a headrest adjustment device to adjust a position of the headrest to accommodate the sensed position of the occupant's head to ease movement of the occupant's head in the event of a sudden change in velocity.

The invention claimed is:

1. A vehicle seat headrest system for use in a vehicle, the headrest system comprising:
   a headrest comprising a receiving face facing forward and at least one headrest support post extending downward for adjustable connection with the vehicle seat, wherein the headrest has a maximum width,
   a distal sensor assembly for detecting a head position of an occupant seated on the vehicle seat, the distal sensor assembly comprising:
   a mount configured to be removably attached to the at least one headrest support post,
   a stem connected with the mount and projecting upward,
   a plurality of arms, each arm having a proximal end connected with the stem and extending lengthwise laterally from the proximal end to a distal end, and
   at least one head position sensor attached to the distal end of each of the plurality of arms for sensing the head position of the occupant,
   a control system in communication with the sensors to receive a communication of a sensed position of the occupant's head and configured to send instructions to a headrest adjustment device to adjust a position of the headrest to accommodate the sensed position of the occupant's head to ease movement of the occupant's head in the event of a sudden change in velocity,
   wherein the distal end of the arms are spaced laterally outward relative to the maximum width of the headrest to minimize engagement with the occupant's head while positioning the sensors for accurate sensing of the head position.

2. The headrest system of claim 1, wherein the plurality of arms includes two arms each having the proximal end connected with opposite lateral sides of the stem and extending from the proximal end to a distal end, and the at least one head position sensor includes at least two head position sensors, each of the two arms having one of the at least two head position sensors secured to the respective distal ends.

3. The headrest system of claim 2, wherein the arms extend laterally away from the headrest in opposing lateral directions and at downward angles.

4. The headrest system of claim 3, wherein the distal end of each arm is laterally spaced apart from the headrest by a distance in a range of about 1 inch to about 7 inches.

5. The headrest system of claim 4, wherein the distal end of each arm is forward of the receiving face of the headrest by a distance in a range of about 0 inches to about 4 inches.

6. The headrest system of claim 1, wherein the headrest includes headrest padding arranged to define the receiving face, and wherein the plurality of arms does not include padding.

7. The headrest system of claim 1, wherein each of the plurality of arms is disposed rearward of the headrest.

8. The headrest system of claim 1, wherein each of the plurality of arms extends laterally away from the headrest and at a downward angle.

9. The headrest system of claim 1, wherein the distal end of each of the arms is adapted to be forward of the receiving face of the headrest by a distance in the range of about 0 inches to about 4 inches.

10. A vehicle seat comprising the headrest system of claim 1, the vehicle seat further comprising a seat body including a seat base and a backrest arranged to extend upward from the base, and the headrest connected with the backrest by the at least one headrest support post such that the headrest projects upward from the backrest.

* * * * *